UNITED STATES PATENT OFFICE.

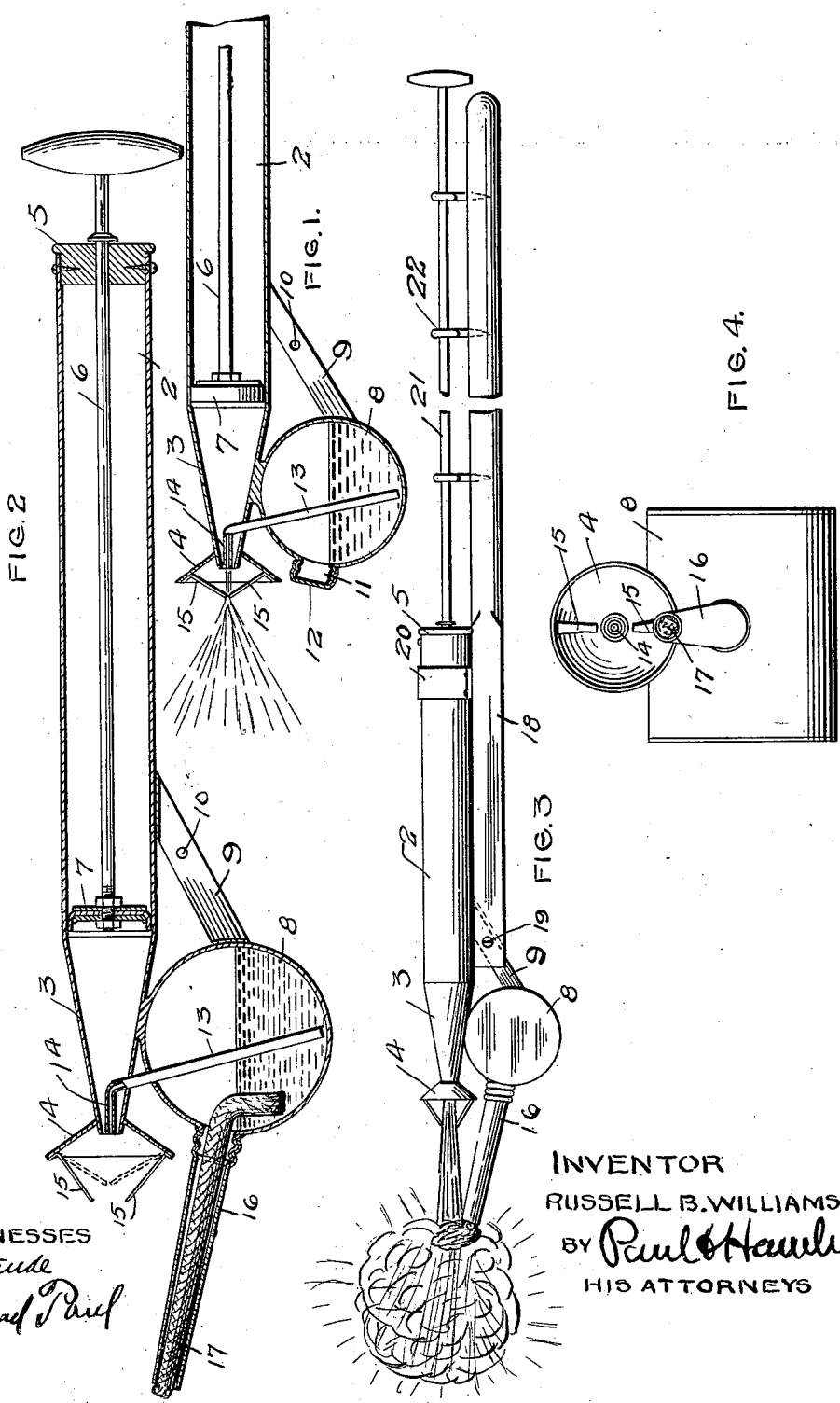

RUSSELL B. WILLIAMSON, OF CLIFTON SPRINGS, NEW YORK.

COMBINED SPRAYING DEVICE AND TORCH.

SPECIFICATION forming part of Letters Patent No. 653,049, dated July 3, 1900.

Application filed January 29, 1900. Serial No. 3,102. (No model.)

*To all whom it may concern:*

Be it known that I, RUSSELL B. WILLIAMSON, of Clifton Springs, Ontario county, New York, have invented certain new and useful Improvements in a Combined Spraying Device and Torch, of which the following is a specification.

The invention relates to spraying devices; and the objects of the invention are, first, to provide a spraying device for quickly and effectually removing worms' nests and spiders' webs from trees and shrubs; second, to provide means for regulating the width of the spray, and, third, to provide improved means for conveying the spraying fluid from the tank to the discharging-point.

The invention consists generally in a pneumatic spraying device provided with a torch attachment.

Further, the invention consists in providing means on the discharge end of the sprayer whereby the operator can increase or decrease the width of the spray.

Further, the invention consists in providing a suction-tube leading from the tank to the pump whose discharge end is substantially concentric with the discharge end of said pump.

Further, the invention consists in various constructions and combinations, all as hereinafter described, and particularly pointed out in the claims.

In the accompanying drawings, forming part of this specification, Figure 1 is a portion of a spraying device embodying my invention. Fig. 2 is a similar view of the complete device with a torch attachment. Fig. 3 is a side view showing the device with torch attachment adapted for use in trees. Fig. 4 is an end view of the device with torch attached.

In the drawings, 2 represents a cylinder having a tapered end 3, terminating in a nozzle, whereon is arranged a funnel 4 of any suitable size. In the opposite end of the cylinder is a plug 5, provided with an opening wherein the stem 6 of the piston 7 is slidable. Secured to the conical end 3 by solder or in any other suitable manner is a reservoir or tank 8, preferably cylindrical in form, connected with the cylinder 2 by a brace 9, having a hole 10, and on the opposite side said tank is provided with an opening 11, through which the tank is filled, said opening being normally closed by a threaded cap 12. A small suction-tube 13 leads from a point near the bottom of the tank through the top of the same and through the conical end 3 and is provided with an outwardly bent or turned end 14, that is in line with the direction of the air-blast and concentric with and preferably flush with the end of the pump-nozzle and offers but little resistance to the air passing through the same. The funnel 4 serves to protect the spray, and I prefer to provide thereon flexible plates 15, secured at their outer end to the funnel and having their inner ends projecting into the path of the spray. When these plates are bent into the position indicated by dotted lines in Fig. 2, the spray will be spread out as soon as it leaves the nozzle of the pump. When it is desired to contract the spray, the plates are bent into the position indicated by full lines in Fig. 2. The operator is thus able to contract or spread the atomizing-spray at will and dispense with the double suction-tube sprayer.

In order that the device may be used for removing worms' nests from trees and shrubbery, I provide a tube 16, having a threaded end to fit over the opening 11 on the reservoir and provided with a wick 17, one end of which extends down into the liquid in the tank. The tank is then filled with oil, such as kerosene or other suitable burning liquid, and the wick being lighted the spray as it is discharged from the nozzle of the pump will be ignited, and the quick flash of fire produced at each stroke of the plunger will quickly and effectually destroy worms' nests or spiders' webs without injuring the tree or shrub.

For convenience in reaching among the branches of trees I provide a pole 18, having a slot to receive the brace 9 and a screw or bolt 19 to enter the hole 10. A band 20 passes over the cylinder 2 and secures the end of the pole thereon. A long stem 21 is provided for the piston and a series of guides 22 are provided on the pole 18, wherein the stem is slidable. This pole attachment may be jointed, if preferred, and permits the operator to reach the nests, even though they are among the upper branches of the trees. Whenever desired the pole and torch attachments may be removed and the device used as an ordinary sprayer.

It will be understood that the position of the tank on the pump may be changed and its size and shape may be varied and in various ways the details of construction may be modified without departing from my invention.

Having thus described my invention, I claim as new and desire to secure by Letters Patent—

1. A combined spraying device and torch, comprising a tank adapted to contain oil or other suitable liquid, a pump, a tube leading from the interior of said tank and terminating in operative proximity to the discharge end of said pump, and a second tube leading from said tank and provided with a suitable wick.

2. A combined spraying device and torch, comprising a tank containing oil or other suitable liquid, a pump and a tube leading to the interior of said tank and terminating in operative proximity to the discharge end of said pump, and a torch device provided in the wall of said tank and projecting into the path of the spray from said pipe, substantially as described.

3. A spraying device, comprising a tank, a pump and a tube leading from the interior of said tank and terminating in operative proximity to the discharge end of said pump, and adjustable means for spreading the spray as it leaves the nozzle of said pump, substantially as described.

4. A spraying device, comprising a tank or reservoir, a pump, a tube leading from the interior of said tank, said tube penetrating the wall of said pump and having a bent or curved outer end concentric with the longitudinal axis of said pump, for the purpose specified.

5. The combination, with a tank or reservoir, of a pump, a tube leading from the interior of said tank and terminating in operative proximity to the discharge end of said pump, and flexible plates provided in front of said discharge end in position to be engaged by the spray therefrom, substantially as described.

6. The combination, in a device of the class described, with a tank, of a pump and a tube leading from the interior of said tank and terminating in operative proximity to the discharge end of said pump, the funnel 14 provided on the discharge end of said pump and the plates 15 provided on said funnel, for the purpose specified.

7. In a device of the class described, the combination, with a tank containing oil or other suitable liquid, of a pump, a tube leading from the interior of said tank and terminating near the discharge end of said pump, a torch device connected with said tank and having its outer end in the path of the spray discharged therefrom by said pump, and a suitable extension provided on the barrel of said pump, for the purpose specified.

8. The combination, with a tank containing a supply of oil or other suitable liquid, of a pump, a tube leading from the interior of said tank to the discharge end of said pump, a funnel provided on the discharge end of said pump, flexible plates carried by said funnel in position to engage the spray as it is discharged, a tube leading from said tank to a point in the path of the spray and a wick provided in said tube, substantially as described.

9. In a spraying device, the combination, with a pump, of a tank, a tube leading from the interior of said tank and terminating in operative proximity to the nozzle of said pump, a funnel provided on said nozzle and adjustable means provided on said funnel and projecting into the path of the spray, substantially as described.

In witness whereof I have hereunto set my hand this 24th day of January, 1900.

RUSSELL B. WILLIAMSON.

In presence of—
BURT BALDWIN,
FRANK L. WILLIAMSON.